P. J. FISCHLE.
HORSE-HITCHES.
No. 194,234.  Patented Aug. 14, 1877.
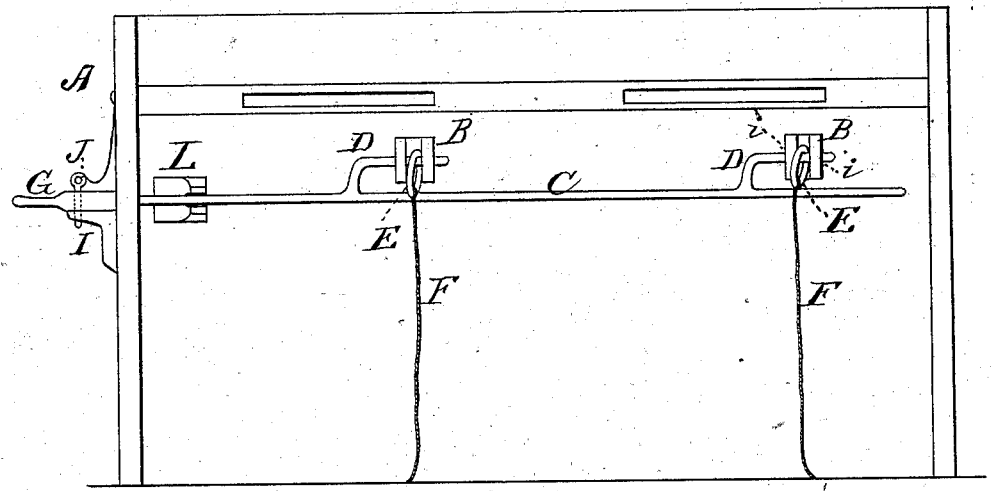
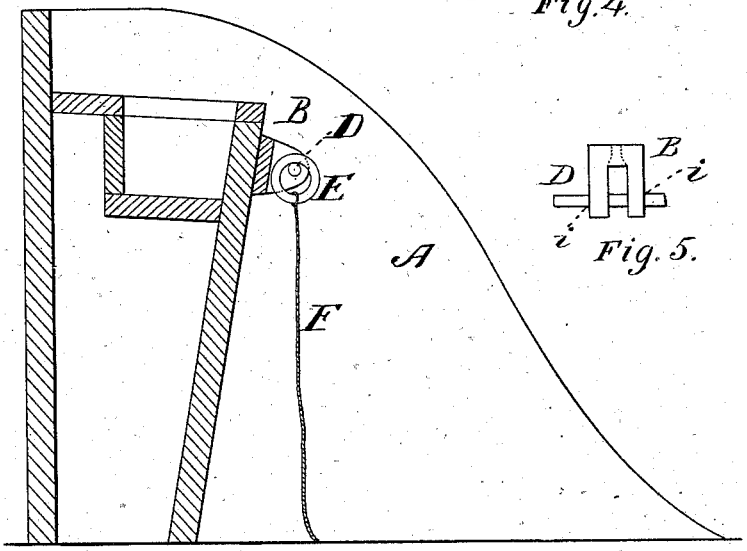

UNITED STATES PATENT OFFICE.

P. JULIUS FISCHLE, OF PHILADELPHIA, PENNSYLVANIA.

IMPROVEMENT IN HORSE-HITCHES.

Specification forming part of Letters Patent No. 194,234, dated August 14, 1877; application filed July 15, 1876.

*To all whom it may concern:*

Be it known that I, P. JULIUS FISCHLE, of Philadelphia, in the county of Philadelphia and State of Pennsylvania, have invented a new and valuable Improvement in Safety-Hitches for Horses; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front elevation of a stable with my safety-hitch applied. Fig. 2 is a cross-sectional view of the same, and Figs. 3, 4, 5, and 6 are details.

This invention has relation to improvements in sliding rods and attachments for simultaneously releasing a number of animals from their stalls; and it consists in the construction and novel arrangement of the squared shank of the rod, its rest and fastening pin, and the forked and perforated supports for the hooks of said rod, as hereinafter shown and described.

In the annexed drawings, the letter A designates an ordinary stable, having a number of spaced feed-troughs or racks, at or near each of which a strong metallic forked support, B, will be secured, in a position such that the ends of the forked part will project therefrom. The ends of the supports will each be provided with registering-eyes *i*, all of which will be in the same horizontal plane—that is, in line with each other.

C represents a metallic rod extending from end to end of the stable, and arranged on a level with the eyes *i* of uprights B. This rod will project at one or both ends through the end walls of the building, and will be provided with suitable bearings therein, adapted to hold it in a horizontal position, and yet allow it free endwise movement. This rod is prevented from rotating by squaring that portion of the same working in the end bearings, which will then be of corresponding form.

D represents rectangular hooks, secured to rod C at a distance apart equal to that of supports B, and adapted to be passed each through the eyes *i* of one of the said supports, thereby attaching thereto a metallic ring, E, upon the free end of a halter, F. These rings are designed to be held permanently in their places by hooks D under ordinary circumstances, and the halter will be detached therefrom should an animal be required for use; but in the event of a fire, when it is most desirable to be expeditious in leading out the animals, rod C will be retracted, and will thus simultaneously disengage all the rings from the hooks and supports, thereby freeing the animals by one and the same movement.

G represents a preferably metallic handle, secured in any suitable manner to the projecting end of the rod C, by which it may be conveniently manipulated, and I is a metallic bracket secured to the outside of the end wall of the stable, just under the handle. The bracket and handle are each provided with a perforation which will register the one with the other, when hooks D are engaged with the forked uprights B, and I lock the said rod against casual endwise movement by a pin, J, which is passed through the said handle and bracket. The upper horizontal face of this bracket is designed to be a broad, flat surface, and the under side of the handle G is also flat; the two planes fitting snugly, the one upon the other, and thereby preventing the rod C from rotating, and keeping the latch-hooks D at all times in position for engaging with the eyes of the supports. Being made incapable of rotating, rod C will have its hooks D at all times in position for engaging with the uprights, provided it be prevented from sagging. This I prevent by means of grooved brackets L, in which the said rod rests, or by means of hangers from which the same depends. The same result may, however, be attained by passing the rod through the dividing walls of the stalls. It is evident that the device above explained will be equally efficacious in cattle-cars, sheds, steamboats, or other shelter for domestic animals.

What I claim as new, and desire to secure by Letters Patent, is—

The handle G, squared upon one side, in combination with the bracket I, having the D-shaped orifice, and the guide-bracket L, as and for the purpose described.

In testimony that I claim the above I have hereunto subscribed my name in the presence of two witnesses.

PH. JULIUS FISCHLE.

Witnesses:
 JOHN McNEE,
 JULIUS IMMEL.